United States Patent
Bailey et al.

(10) Patent No.: US 7,698,601 B2
(45) Date of Patent: Apr. 13, 2010

(54) METHOD AND COMPUTER PROGRAM PRODUCT FOR DETERMINING A MINIMALLY DEGRADED CONFIGURATION WHEN FAILURES OCCUR ALONG CONNECTIONS

(75) Inventors: Sheldon R. Bailey, Rochester, MN (US); Alwood P. Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 11/777,681

(22) Filed: Jul. 13, 2007

(65) Prior Publication Data

US 2009/0019309 A1 Jan. 15, 2009

(51) Int. Cl.
*G06F 11/00* (2006.01)
(52) U.S. Cl. ............................................. 714/43; 714/4
(58) Field of Classification Search ...................... 714/4, 714/43
See application file for complete search history.

(56) References Cited

U.S. PATENT DOCUMENTS

| | | | |
|---|---|---|---|
| 5,933,422 A * | 8/1999 | Kusano et al. | 370/331 |
| 5,951,686 A | 9/1999 | McLaughlin et al. | |
| 6,233,680 B1 | 5/2001 | Bossen et al. | |
| 6,243,823 B1 | 6/2001 | Bossen et al. | |
| 6,728,668 B1 | 4/2004 | Kitamorn et al. | |
| 6,789,048 B2 | 9/2004 | Arndt et al. | |
| 6,813,634 B1 | 11/2004 | Ahmed | |
| 6,832,329 B2 | 11/2004 | Ahmed | |
| 7,120,559 B1 | 10/2006 | Williams et al. | |
| 7,380,017 B2 * | 5/2008 | Weil et al. | 709/239 |
| 2002/0133756 A1 * | 9/2002 | Jain | 714/43 |
| 2003/0149908 A1 * | 8/2003 | Ho et al. | 714/4 |
| 2005/0022048 A1 * | 1/2005 | Crouch | 714/4 |
| 2005/0229039 A1 * | 10/2005 | Anderson et al. | 714/23 |
| 2009/0213725 A1 * | 8/2009 | Kibel et al. | 370/216 |

OTHER PUBLICATIONS

F.W. Angelotti, et al. "Algorithm for Tolerating Interconnect Faults in the AS/400"; IBM Technical Disclosure Bulletin vol. 37, No. 02B; Feb. 1994; pp. 433-434.

* cited by examiner

*Primary Examiner*—Bryce P Bonzo
(74) *Attorney, Agent, or Firm*—Cantor Colburn LLP

(57) ABSTRACT

A minimally degraded configuration is determined when failing connections occur. Associative deconfigurations are determined from deconfiguring hardware items in a server system, associative groups are derived, and failed connections are determined. Failed connections are determined between two hardware items that are in the same associative group, and the two hardware items at both endpoints of the failed connection are deconfigured. Each associative group state is set to unknown, and the failed connections are counted where a single endpoint of the failed connection is within the associative group. The associative group state is set to deconfigured, if a member of the associative group was deconfigured. Counts of the associative groups that remain in the unknown state are analyzed, and the associative group with the smallest failed connection count is selected and set to a configured state. The other associative group at the other end is set to a deconfigured stated, and the hardware item in the other associative group is deconfigured.

5 Claims, 3 Drawing Sheets

METHOD AND COMPUTER PROGRAM PRODUCT FOR DETERMINING A MINIMALLY DEGRADED CONFIGURATION WHEN FAILURES OCCUR ALONG CONNECTIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to deconfiguring a system or system components, and particularly to determining a minimally degraded configuration when failures occur along chip connections.

In today's server systems, it is quite likely to have many cooperative processors all contained within a single system. These processors have communication paths (e.g., connections) to transfer data between fellow processors within the system. As the number of processors in a system increases, the probability of having an error along one of these communication paths increases. Further, errors may occur in components on a multi-path network (e.g., in a communication path), such as processing nodes in a supercomputer or a multi-path input/output (IO) system, where the paths between the processor and hard-drives are through two or more IO adapters.

In order to facilitate high-end reliability, availability, and serviceability (RAS) capabilities in server systems or other systems, operators have the ability of deconfiguring a hardware entity, such as a processor, when a failure occurs. When the failure is along one of the communication paths between two processors, the failure is typically detected at one or both ends of the communication path and is translated, by diagnostics software, into a "connection deconfiguration" event.

Typically, large server configurations involve a number of tightly coupled processors on a single system board or drawer. These drawers of tightly coupled processors are attached via interconnects to a number of other drawers to create the full server system. Due to hardware implementation or for firmware simplicity, deconfiguring a single processor on a drawer may require deconfiguring some or all of the other processors on the drawer. These secondary deconfigurations are called "associative" deconfigurations.

The current implementation of handling a "connection deconfiguration" event is to deconfigure the two hardware items on each end of the connection. If multiple "connection deconfiguration" events occur on a system, this implementation could lead to many more processors being deconfigured than necessary. When coupled with the "associative" deconfigurations, this can lead to greatly reduced system performance, potentially leaving the system with only one drawer or even one processor left functional.

It is therefore desirable to have a method and computer program product that provide minimal deconfigurations when failures occur.

SUMMARY

An exemplary embodiment includes a method and computer program product for determining a minimally degraded configuration when failing connections occur. Associative deconfigurations that result from deconfiguring hardware items in a server system are determined. Associative groups are derived based on the associative deconfigurations. A list of failed connections is determined in the server system, and the failed connections are paths between hardware items. Failed connections are determined between two hardware items that are in the same associative group, and the two hardware items are deconfigured at both endpoints of the failed connection.

Also, each associative group state is set to unknown. The number of failed connections are counted in which a single endpoint of the faded connection is within the associative group. The associative group state is set to deconfigured, if a member of the associative group was deconfigured. Counts of the associative groups that remain in the unknown state are analyzed, and the associative group is selected with the smallest felled connection count. The associative group with the smallest failed connection count is set to a configured state.

Further, for every failed connection to and from the associative group with the smallest failed connection count, the other associative group(s) at the other end of the failed connection(s) is set to a deconfigured state. The hardware item(s) within the other associative group(s) is deconfigured. Selecting and state setting are continued until there are no more unknown associative groups.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE EXEMPLARY EMBODIMENT

An exemplary embodiment discloses a process using additional system topology information to determine the minimal number of deconfigurations required to prevent the use of all bad connections.

In considering the handling of failures along a connection, it is understood that deconfiguring one of the hardware items on either end of the connection will prevent the use of the connection itself. However, depending on system topology, and the associative deconfigurations induced by the system topology, the optimal choice for which end of a connection to deconfigure can vary. The exemplary embodiment in FIGS. 1A and 1B disclose a process of selecting (choosing) hardware items to deconfigure such that every faded connection is removed and the resulting system configuration is a minimally degraded configuration, resulting in much higher system performance.

Figure 1A:
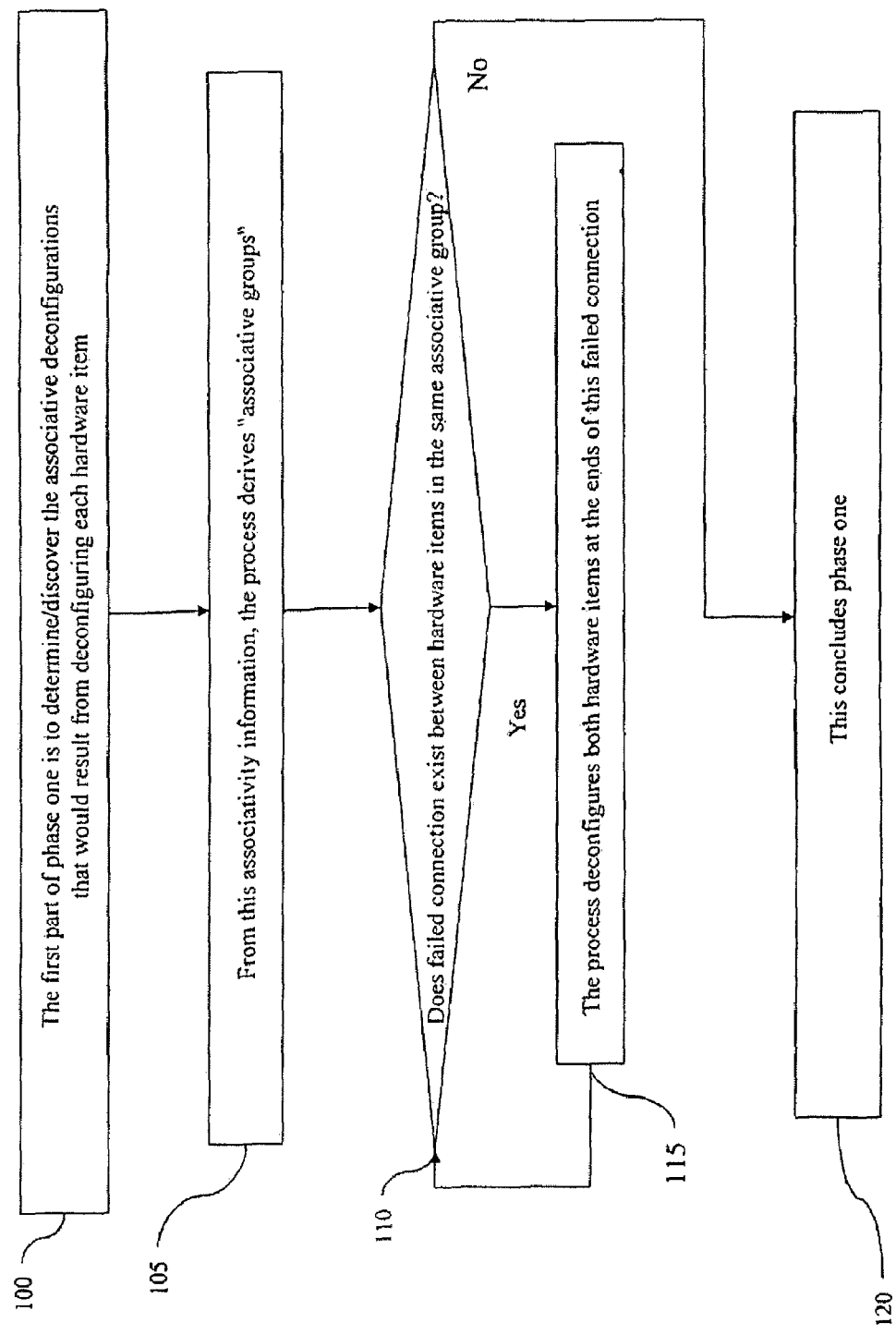
FIG. 1A illustrates a flow chart for determining a minimally degraded configuration in accordance with an exemplary embodiment.
Figure 1B:
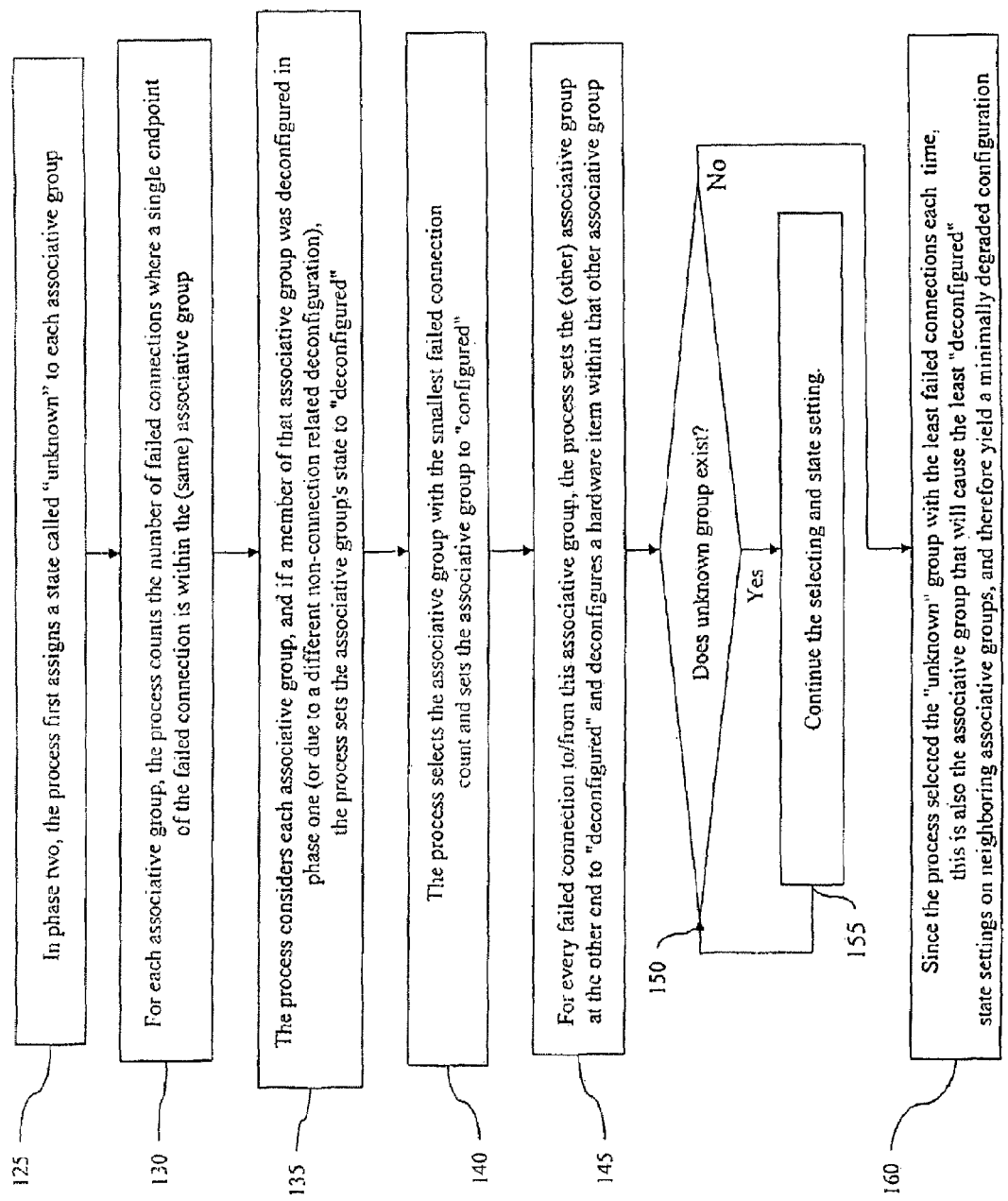
FIG. 1B continues the flow chart for determining a minimally degraded configuration in accordance with the exemplary embodiment.

In FIGS. 1A and 1B, there are two phases to the process for determining the minimally degraded configuration in accordance with the exemplary embodiment. In the first phase, failing connections are considered where the hardware items at either end are related by an associative deconfiguration relationship.

In the second phase, the hardware items are grouped according to the associative deconfiguration relationships, and failing connections are considered where the hardware items at either end are in two different groups. By combining the two-phased approach, a process is set forth which determines a configuration where every failed connection is unused and has the minimum number of hardware entities (items) deconfigured.

The first part of phase one is to determine/discover the associative deconfigurations that would result from deconfiguring each hardware item at 100. As non-limiting examples, this data (e.g., associativity information) could be hard-coded, supplied via a file, or determined dynamically by some other software mechanism. From this associativity information, the process derives "associative groups" at 105. As non-limiting examples, two hardware items A and B are in the same associative group if deconfiguring A results in deconfiguring B or vice versa. Also, in systems without a concept of associative deconfiguration, each hardware item would be in its own associative group.

Once the process determines the associative groups, the process continues to complete the second part of phase one. From a list of failed connections, the process determines or considers whether failures (i.e., failed connections) between two hardware items which are in the same associative group exist at 110. For each of these failed connections, the process deconfigures both hardware items at the ends of this failed connection at 115. Since these two hardware items are associatively linked, and the process must deconfigure at least one in order to make their shared connection unused, both of these hardware items will always need to be deconfigured (either normally or associatively). If the hardware items at the ends of the failed connections are deconfigured, phase one is concluded at 120.

Turning to phase two beginning in FIG. 1B, the process first assigns a state called "unknown" to each associative group at 125. Other possible states, later discussed in phase two, are called "configured" and "deconfigured". For each associative group, the process counts the number of failed connections where a single endpoint of the failed connection is within the associative group at 130. Next, the process considers each associative group, and if a member of that associative group was deconfigured in phase one (or due to a different non-connection related deconfiguration), the process sets the associative group's state to "deconfigured" at 135.

At this point, there are some associative groups that remain in an "unknown" state. The process selects the associative group with the smallest failed connection count and sets the associative group to "configured" at 140. For every failed connection to/from tins associative group, the process sets the (other) associative group at the other end to "deconfigured" and deconfigures a hardware item within that other associative group at 145. The process determines if any "unknown" groups remain at 150. The process continues this selecting (choosing) and state setting until there are no more "unknown" groups at 155. If there are no "unknown" groups, the process goes to operation 160.

Once all associative groups have been assigned a state, there are no more associative groups in a "configured" state that share a failed connection. This is due to every failed connection having one "configured" associative group at 140, and one or more "deconfigured" associative groups at 145. In addition, every associative group that is in a "deconfigured" state will have at least one hardware item deconfigured, either in phase one or two or due to an earlier deconfiguration event, which result in an associative deconfiguration of all the other items contained within the associative group. Since the process selected the "unknown" group with the least failed connections each time, this is also the associative group that will cause the least "deconfigured" state settings on neighboring associative groups, and therefore yield a minimally degraded configuration at 160.

The process of the exemplary embodiment has been presented as phase one and phase two only for the sake of clarity, and the presentation of two phases in not meant to be limiting in any manner.

Figure 2:
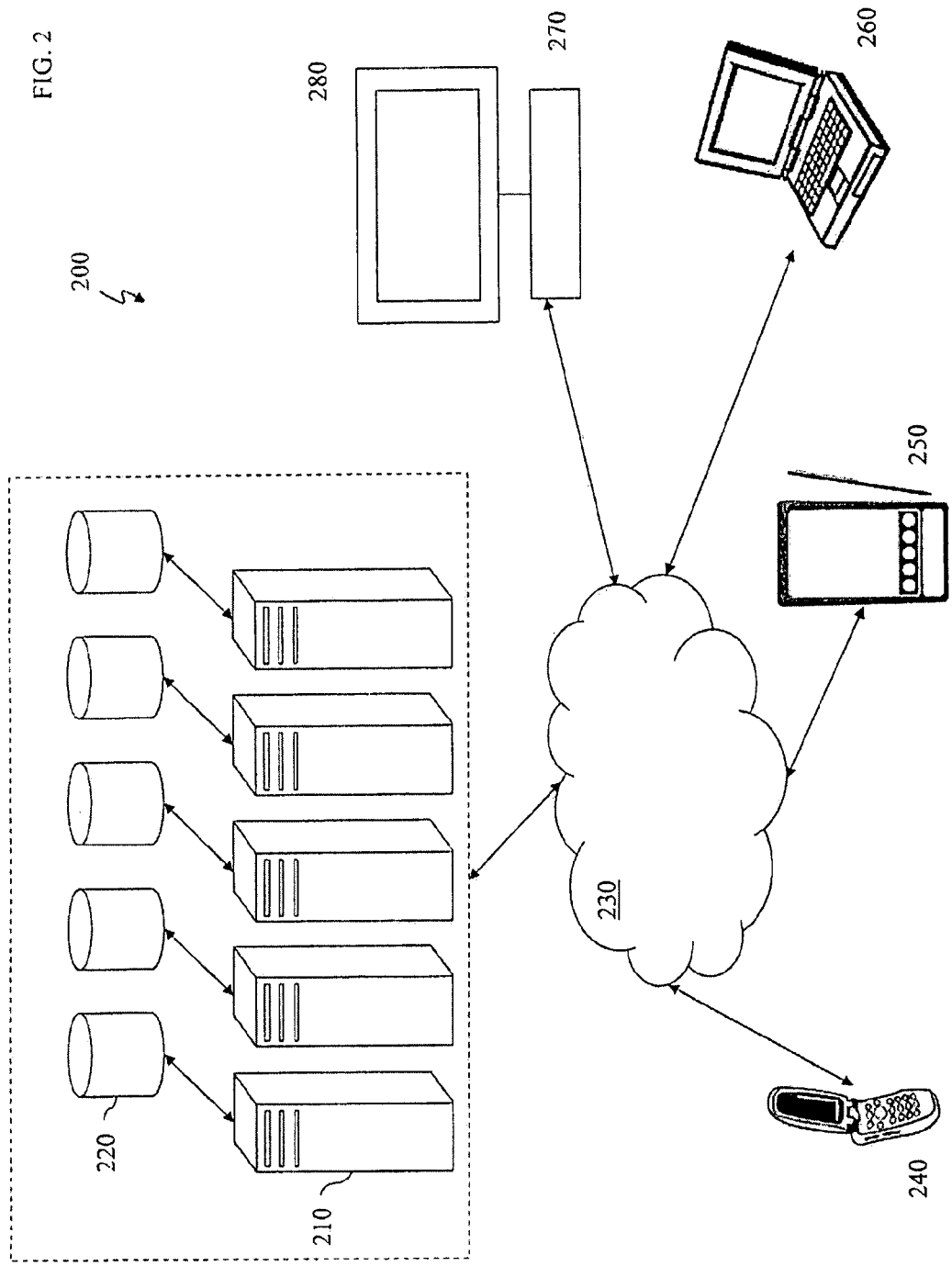
FIG. 2 is a block diagram of an exemplary system.

FIG. 2 is a block diagram of an exemplary system 200. The exemplary system 200 can utilize the process, e.g., as a computer program product, of the exemplary embodiment disclosed herein. The system 200 in FIG. 2 includes servers 210 communicatively coupled to storage devices 220, and the servers 210 are communicatively coupled to a network 230. As well, various communication devices, such as a cell phone 240, a PDA 250, a computer 260, a set top box 270 communicatively coupled to a display screen 280, etc., can be communicatively coupled to the network 230.

The network 230 may include circuit-switched and/or packet-switched technologies and devices, such as routers, switches, hubs, gateways (e.g., residential gateways, including a DSL modem, etc.), IMS-based networks, etc., for facilitating communications between the various communications devices (240, 250, 260, 270, 280) and the servers 210. The network 210 may include wireline (e.g., fiber optic lines) and/or wireless components utilizing, e.g., 802.11 standards for providing over-the-air transmissions of communications. The network 210 can be an IP-based network for communication via a broadband connection.

Generally, in terms of the hardware architecture for the system 200, the servers 210 and communication devices (240, 250, 260, 270, 280) may include processors, memory, and one or more input and/or output (I/O) devices (or peripherals), such as databases or storage devices 220, that are communicatively coupled via a local interface. The local interface can be, for example but not limited to, one or more buses or other wired or wireless connections utilized by the servers 210 or communication devices, as is known in the art. The local interlace may have additional elements such as controllers, buffers (caches), drivers, repeaters, and receivers, to enable communications. Further, the local interface may include address, control, and/or data connections to enable appropriate communications among the aforementioned components.

The processors, in the servers 210 and communication devices (240, 250, 260, 270, 280), are hardware devices for executing software that can be stored in memory. The processors can be virtually any custom made or commercially available processor, central processing unit (CPU), and semiconductor based microprocessor (in the form of a microchip) or macroprocessor.

The memory can include any one or combination of volatile memory elements (e.g., random access memory (RAM, such as dynamic random access memory (DRAM), static random access memory (SRAM), etc.)) and nonvolatile memory elements (e.g., read only memory (ROM), erasable programmable read only memory (EPROM), electronically erasable programmable read only memory (EEPROM), programmable read only memory (PROM), tape, compact disc (CD-ROM), DVD read on memory, magnetic disk, diskette, cartridge, cassette or the like, etc.). Moreover, the memory may incorporate electronic, magnetic, optical, and/or other types of storage media. Note that the memory can have a distributed architecture, where various components are remotely situated from one another, but still can be accessed by a processor.

The software in the memory may include one or more separate programs, each of which comprises an ordered listing of executable instructions for implementing logical functions. The software in the memory includes, but is not limited to, a suitable operating system (O/S) and the process (or computer program product) of the exemplary embodiment.

The operating system essentially controls the execution of computer programs (which may include the computer program product of the exemplary embodiment) and provides scheduling, input-output, control, file and data management, memory management, and communication control and related services. However, it is contemplated by the inventors that the computer program product of the exemplary embodiment is applicable on all commercially available operating systems.

The computer program product of the exemplary embodiment may be a source program, executable program (object code), script, or any other entity comprising a set of instructions to be performed. When a source program, then the computer program product is usually translated via a compiler, assembler, interpreter, or the like, which may or may not be included within the memory, so as to operate properly in connection with the O/S. Furthermore, the computer program product of the exemplary embodiment can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, ADA, etc.

The servers 210 and communication devices (240, 250, 260, 270, 280) may have software in the memory that further includes a basic input output system (BIOS). The BIOS is a set of essential software routines that initialize and test hardware at startup, start the O/S, and support the transfer of data among the hardware devices. The BIOS is stored in some type of read-only-memory, such as ROM, PROM, EPROM, EEPROM, etc., so that the BIOS can be executed when the computer is activated.

In the servers 210 and communication devices, the processor is configured to execute software stored within the memory, to communicate data to and from the memory, and to generally control operations of the computer pursuant to the software.

The computer program product of the exemplary embodiment can be stored on virtually any computer readable medium for use by or in connection with any computer related system or method. In the context of this disclosure, a computer readable medium may be an electronic, magnetic, optical, or other physical device or means that can contain or store a computer program for use by or in connection with a computer related system or method. The computer program product of the exemplary embodiment can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this disclosure, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can he electronically captured, via for instance optical scanning of the paper or other medium, then compiled, interpreted or otherwise processed in a suitable manner if necessary, and then stored in a computer memory.

If the computer program product of the exemplary embodiment is implemented in hardware, the exemplary embodiment can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for determining a minimally degraded configuration when failing commotions occur, comprising;
   determining associative deconfigurations that result from deconfiguring hardware items in a server system;
   deriving associative groups based on the associative deconfigurations;

determining a list of failed connections in the server system, the failed connections being a path between hardware items;

determining failed connections between two hardware items that are in the same associative group and deconfiguring the two hardware items at both endpoints of the failed connection;

setting each associative group state to unknown;

counting the number of failed connections in which a single endpoint of the failed connection is within the associative group;

setting the associative group state to deconfigured, if a member of the associative group was deconfigured;

analyzing counts of the associative groups that remain in the unknown state;

selecting the associative group with the smallest failed connection count;

setting the associative group with the smallest failed connection count to a configured state;

for every failed connection to and from the associative group with the smallest failed connection count, setting the other associative group at the other end of the failed connection to a deconfigured state;

deconfiguring the hardware item within the other associative group; and continuing selecting and state setting until there are no more unknown associative groups.

2. The method of claim 1, wherein every associative group that is in the deconfigured state has at least one hardware item deconfigured, which results in an associative deconfiguration of all other hardware items contained within the deconfigured associative group.

3. The method of claim 1, further comprising selecting the unknown associative group with the least failed connections each time, such that associative groups are set to configured that cause the least amount of deconfigured state settings on neighboring associative groups.

4. A computer program product, tangibly embodied on a computer readable medium, for determining a minimally degraded configuration when failing connections occur, the computer program product including instructions for causing a computer to execute a method, comprising:

determining associative deconfigurations that result from deconfiguring hardware items in a server system;

deriving associative groups based on the associative deconfigurations;

determining a list of failed connections in the server system, the failed connections being a path between hardware items;

determining failed connections between two hardware items that are in the same associative group and deconfiguring the two hardware items at both endpoints of the failed connection;

setting each associative group state to unknown;

counting the number of failed connections in which a single endpoint of the failed connection is within the associative group;

setting the associative group state to deconfigured, if a member of the associative group was deconfigured;

analyzing counts of the associative groups that remain in the unknown state;

selecting the associative group with the smallest failed connection count;

setting the associative group with the smallest failed connection count to a configured state;

for every failed connection to and from the associative group with the smallest failed connection count, setting the other associative group at the other end of the failed connection to a deconfigured state;

deconfiguring the hardware item within the other associative group; and continuing selecting and state setting until there are no more unknown associative groups.

5. The computer program product of claim 4, further comprising instructions for causing a computer to execute selecting the unknown associative group with the least failed connections each time, such that associative groups are set to configured that cause the least amount of deconfigured state settings on neighboring associative groups.

* * * * *